United States Patent [19]

McGinn

[11] 4,349,839
[45] Sep. 14, 1982

[54] VERTICAL SYNC COUNTER HAVING MULTI MODES OF OPERATION FOR DIFFERENT TV SYSTEMS STANDARDS

[75] Inventor: Michael McGinn, Tempe, Ariz.
[73] Assignee: Motorola, Inc., Schaumburg, Ill.
[21] Appl. No.: 220,610
[22] Filed: Dec. 29, 1980
[51] Int. Cl.³ .............................................. H04N 5/04
[52] U.S. Cl. .................................. 358/148; 358/140; 358/154
[58] Field of Search ........................ 358/148, 154, 140

[56] References Cited
U.S. PATENT DOCUMENTS
4,303,940  12/1981  Ciciora ............................... 358/142

Primary Examiner—Robert L. Richardson
Attorney, Agent, or Firm—Charles R. Lewis

[57] ABSTRACT

A TV receiver having a single vertical sync counter is combined with various gates and a latch circuit to provide two modes of operation. In the first mode of operation, the vertical counter counts up to a first predetermined number of pulses at which time the counter is automatically reset. In the second mode of operation the counter is counted up to a second predetermined number of pulses which is greater than the number of pulses in the first mode before automatically resetting. The two modes of operation enable the TV receiver to readily operate in TV systems having different number of lines per picture.

19 Claims, 6 Drawing Figures

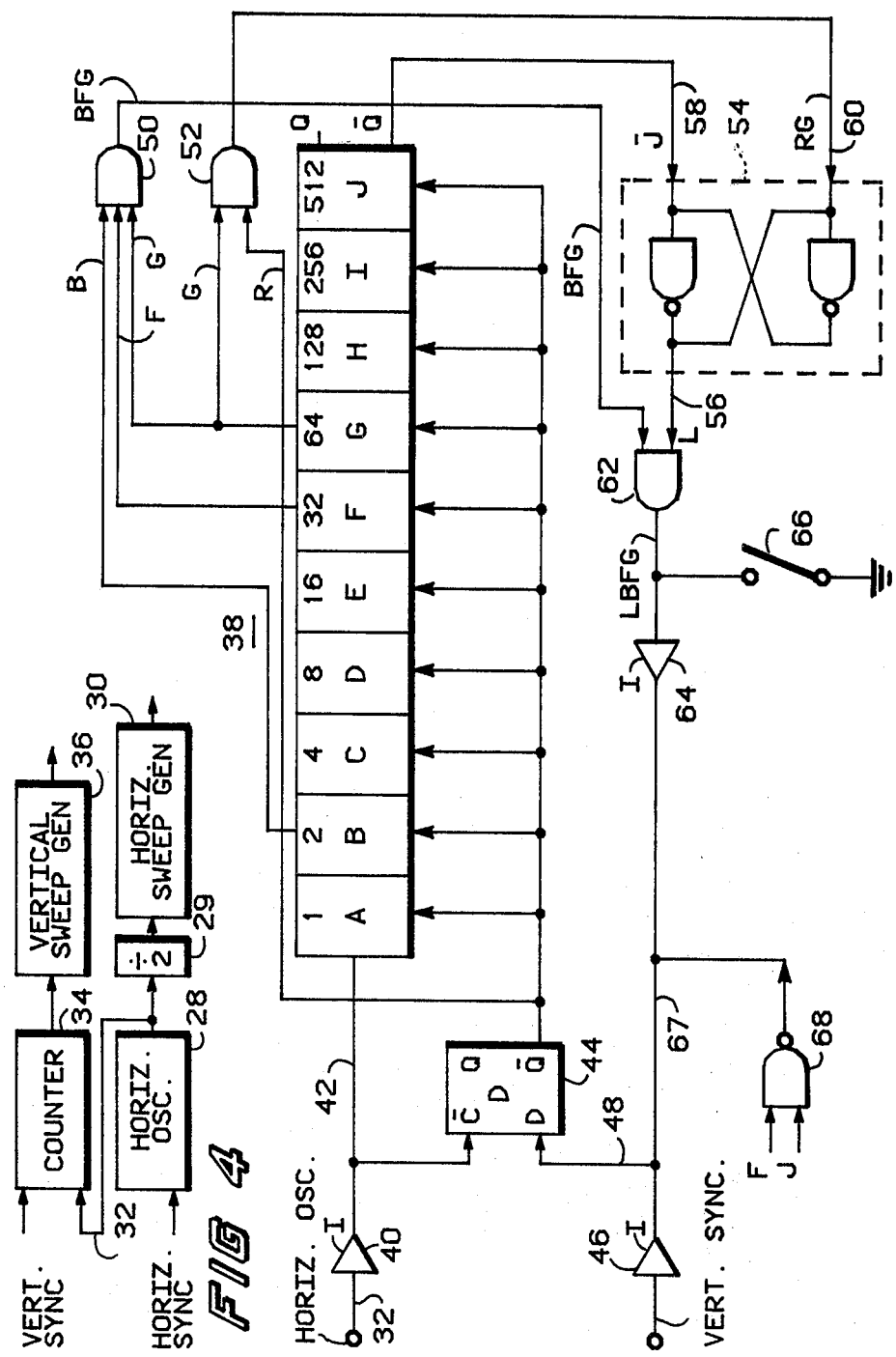

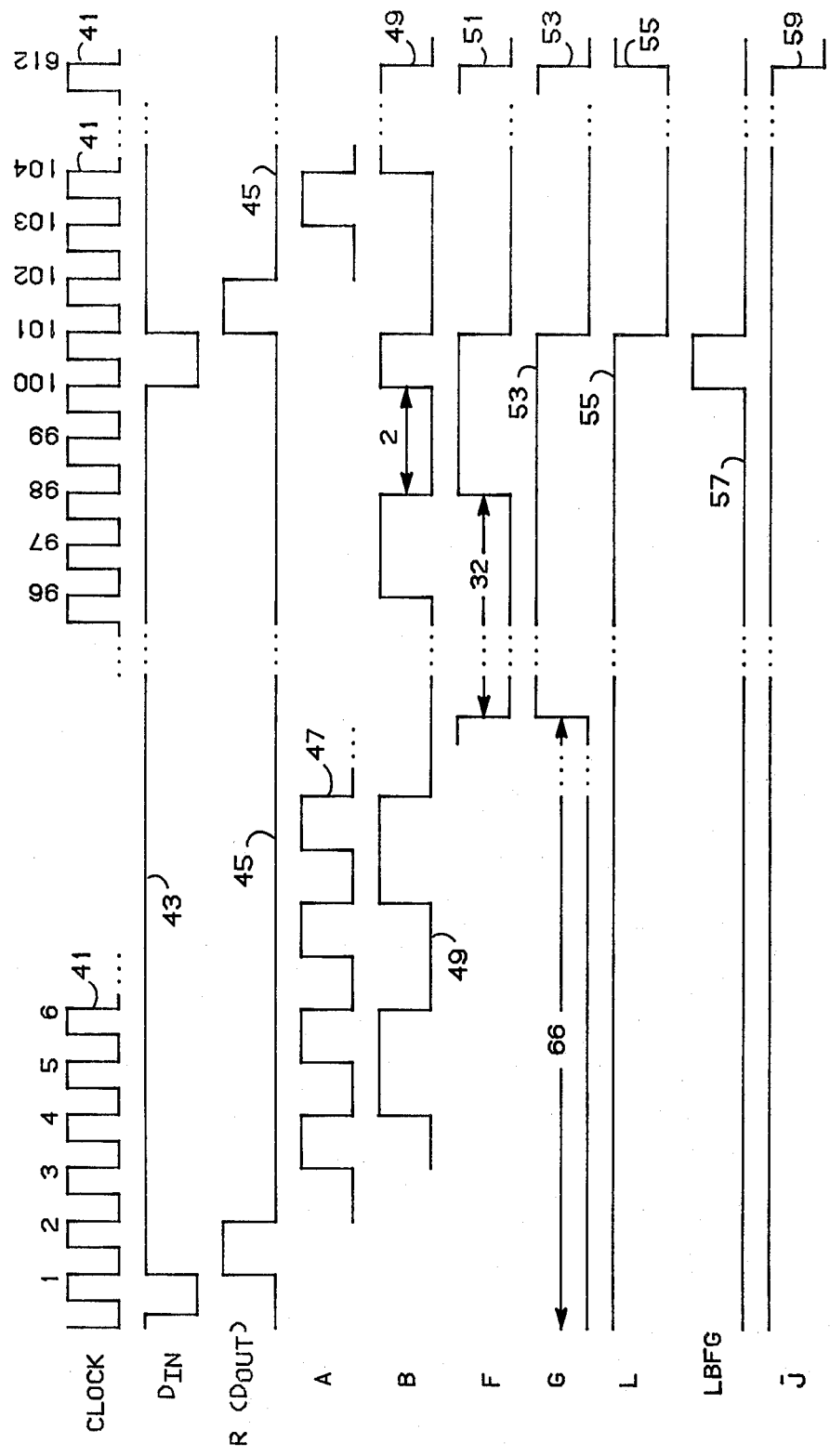

VERTICAL SYNC COUNTER HAVING MULTI MODES OF OPERATION FOR DIFFERENT TV SYSTEMS STANDARDS

CROSS REFERENCE TO RELATED APPLICATIONS

1. Ser. No. 220,606, filed Dec. 29, 1980 "Horizontal Oscillator"
2. Ser. No. 220,604, filed Dec. 29, 1980 "Horizontal Phase Detector Gain Control"
3. Ser. No. 220,608, filed Dec. 29, 1980 "Horizontal Phase Lock Loop For Television"
4. Ser. No. 220,328, filed Dec. 29, 1980 "Linear Full Wave Rectifier and Method for Providing Full Wave Rectified Signals"
5. Ser. No. 220,607, filed Dec. 29, 1980 "Large Scale, Single Chip Integrated Circuit Television Receiver Subsystem"
6. Ser. No. 220,609, filed Dec. 29, 1980 "Variable Capacitance Circuit"
7. Ser. No. 220,605, filed Dec. 29, 1980 "Crossover Circuit for Use in Automatic Gain Control Systems"
8. Ser. No. 220,329, filed Dec. 29, 1980 "Linear Full Wave Rectifier Circuit"
9. Ser. No. 220,611, filed Dec. 29, 1980 "Sync Separator"
10. Ser. No. 220,614, filed Dec. 29, 1980 "Integrator Circuit For Separating Vertical Sync Pulses"

BACKGROUND OF THE INVENTION

This invention relates to a vertical sync counter for a television receiver and more particularly to a vertical sync counter having a first mode of operation wherein the counter counts up to a first preselected number of horizontal pulses and a second mode of operation where the counter counts up to a second preselected number of horizontal pulses to enable the TV receiver to be readily fabricated or manufactured for use in TV systems having a different number of lines per picture.

Some TV receivers include both a free running vertical oscillator and a free running horizontal oscillator. However, for reasons of economy and manufacturing simplicity, some TV receivers have the vertical oscillator replaced with a counter that is driven by the output of the free running horizontal oscillator. This is possible because of the fixed relationship between the vertical and horizontal frequencies. The number of lines in a TV picture vary throughout the world. For example, in the United States each TV picture contains five hundred twenty-five lines whereas in Europe each TV picture contains six hundred twenty-five lines. It is desirable to be able to manufacture TV receivers that are operable in both systems without the necessity of using two different vertical counters or two different manufacturing techniques and/or systems. This is particularly true when the TV receiver is fabricated on one or more integrated circuits.

Accordingly, one object of this invention is to provide an improved vertical sync counter for a TV receiver.

Another object of this invention is to provide a vertical sync counter having a first mode of operation wherein the counter is reset automatically after counting up to a first predetermined number of pulses and a second mode of operation wherein the counter is automatically reset after counting up to a second different number of predetermined pulses.

Still another object of this invention is to provide a vertical sync counter which is readily enabled to operate in one of two modes of operation to enable a TV receiver to be easily manufactured for use in TV systems having different numbers of lines per picture.

BRIEF SUMMARY OF THE INVENTION

Briefly described, a vertical counter for a TV receiver having a horizontal oscillator for providing horizontal sync pulses in accordance with the present invention includes the vertical counter being adapted to provide output pulses to a vertical sweep generator and also adapted to receive a vertical sync pulse to synchronize the counter. The vertical counter has a first mode of operation in the absence of an incoming vertical sync pulse wherein the counter counts up to a first predetermined number of horizontal pulses at which time the counter is automatically reset and provides a vertical output pulse and has at least a second mode of operation wherein the counter counts up to a second predetermined number of horizontal pulses at which time the counter is automatically reset and provides a vertical output pulse. It is a characteristic of the present invention that the second predetermined number of pulses is larger than the first predetermined number of pulses. The vertical counter in the second mode of operation has a cycle of operation wherein the counter counts up to a third predetermined number of pulses which is less than the first number of predetermined pulses in the first mode of operation after which the counter is automatically reset without providing a vertical output pulse and then the counter counts up to at least a fourth predetermined number of pulses at which time the counter is automatically reset and provides a vertical output pulse and the cycle is repeated. The sum of the third and fourth predetermined number of pulses is equal to the second predetermined number of pulses for the second mode of operation.

DESCRIPTION OF THE DRAWINGS

The present invention will be readily understood from consideration of the following detailed description taken in conjunction with the attached drawings wherein like reference characters designate like or corresponding parts throughout the several figures and wherein;

FIG. 4 illustrates in more detail a portion of the horizontal and vertical sweep portions of the typical TV receiver shown in FIG. 3;

FIG. 5 is a logic diagram which shows a vertical counter for a TV receiver in accordance with the present invention; and FIG. 6 illustrates idealized wave shapes that occur throughout the vertical sync counter system illustrated in FIG. 5.

FIGS. 1 and 2 illustrate the composite video signal received by a television (TV) receiver.

FIG. 3 is a block diagram of a basic prior art television receiver;

FIG. 4 is a block diagram of the inventive horizontal phase lock loop; and

FIGS. 5A, 5B and 5C illustrate waveforms appearing at certain points in FIG. 1.

DESCRIPTION OF THE PREFERRED EMBODIMENT

Before embarking on a detailed discussion of the invention, it may be helpful to briefly review basic television principles. A complete TV picture appears on the TV screen a number of times per second and consists of two interlaced frames. Between each frame there is an interval during which the screen is dark. Each TV frame, however, is not projected as a complete unit but is created by varying the lightness of a moving spot of light. That is, the picture tube contains an electron gun which generates an electron beam which moves very rapidly across a phosphor coated screen and, by changing its strength, different amounts of light are produced in different places. More exactly, the electron beam is focused into a fine point that moves from the upper left-hand corner in a straight nearly horizontal line to the right side of the screen. After each movement from left to right, the beam intensity is reduced so that no light is produced during the return motion from right to left. After each line is painted, the beam is moved down a little on the tube face. While the motion of the electron beam is called "scanning", the electronic actions involved are generally referred to as "sweeping" and we speak of a horizontal sweep frequency of approximately 15,750 cycles per second.

It should be obvious that there must be some synchronization between the image seen by a remote television camera and that which is ultimately shown on the TV screen. If, for example, the receiver scans a picture in more or less than one-thirtieth of a second, the picture will appear to roll vertically. Thus, great care is taken to synchronize accurately the scanning of each line and frame. To achieve this, synchronizing signals are transmitted to the receiver with the sound and video information. In addition to providing signals which control the starting of each line, the edges of the picture must be blanked out to avoid any appearance of ragged edges, and the electron beam must be turned off during the time in which it returns to its starting place. This return time is often referred to as the retrace or flyback period and is approximately 9 microseconds long for each line (the horizontal flyback), but is considerably longer for the period when the beam returns from the bottom to the top of the screen (the vertical flyback period).

Figure 1:
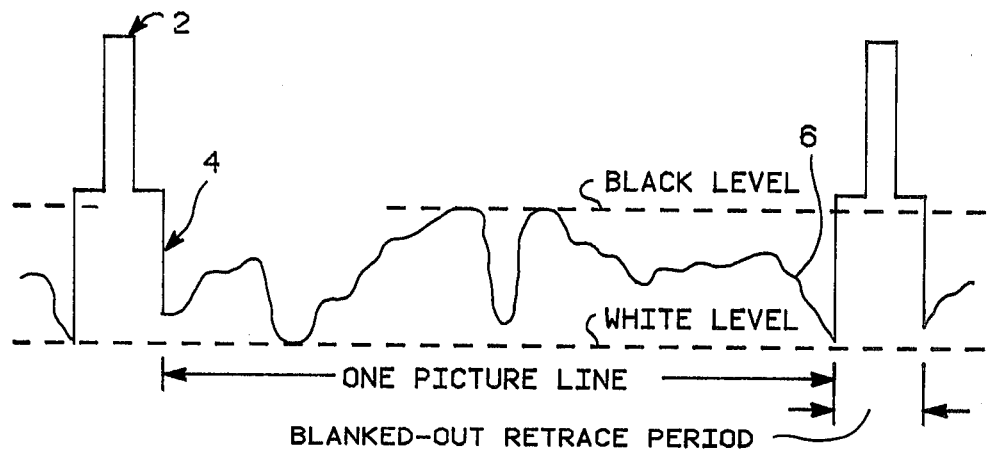
FIGS. 1 and 2 illustrate a composite video signal received by a television (TV) receiver.

FIG. 1 illustrates a black and white video signal including the horizontal synchronization pulses 2 and the horizontal blanking or flyback pulse 4. Interposed between successive flyback pulses is the actual black and white video signal 6 corresponding to one picture line. As can be seen, the horizontal flyback pulse extends into the black region so that the edges of the picture are completely black avoiding the appearance of ragged edges.

Figure 2:
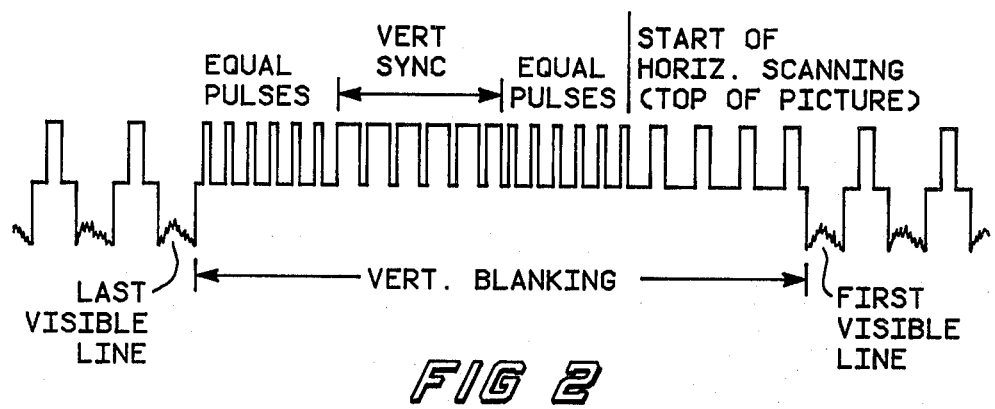

Referring to FIG. 2, the start of each field of vertical scanning is dictated by a vertical synchronization pulse which lasts much longer than the horizontal synchronization pulses. To avoid losing horizontal synchronization during the vertical flyback or blanking period, the horizontal synchronization pulses are superimposed on the vertical blanking pulse. The first six pulses are very narrow and are referred to as equalizing pulses. Next, there are periods of six wide pulses which comprise the actual vertical synchronization pulse serrated by the horizontal synchronization period. This is followed by an additional six equalizing pulses and then four regular horizontal synchronizing pulses that start the top of the picture. Note that the vertical blanking period extends through this time and darkens the screen while the beam moves from bottom to top and covers the first four lines of the picture.

Figure 3:
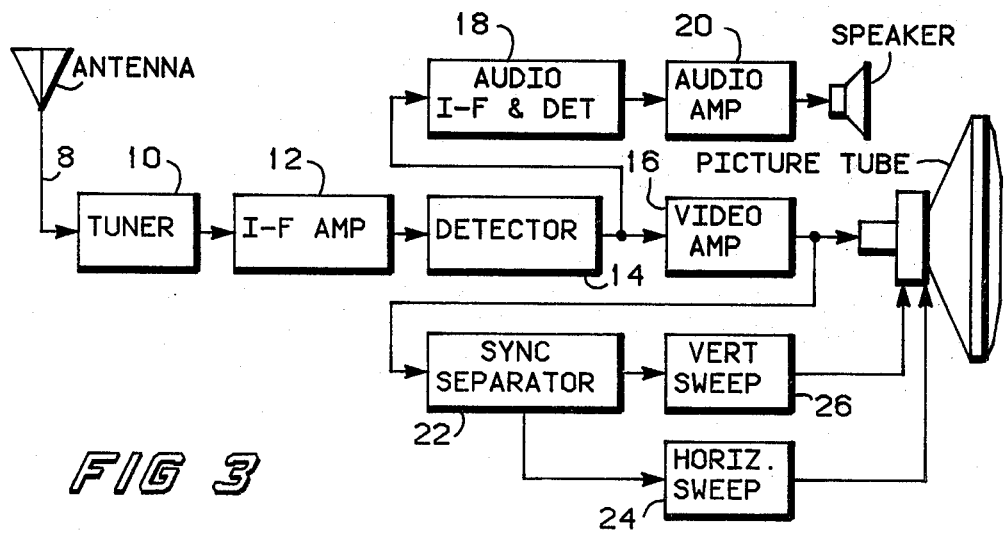
FIG. 3 is a block diagram of a basic prior art TV receiver.

FIG. 3 is a block diagram of a basic black and white TV receiver. From the antenna, a transmission line 8 brings all signals received by the antenna to tuner 10 whose function it is to select the desired band of frequencies and reject all others. The tuner passes only the desired signal to the IF amplifiers 12.

Television IF amplifiers 12 include a plurality of IF stages which amplify the IF signals. To prevent overloading and to minimize picture changes during fading, automatic gain control is used to control the amplification of the IF signal.

The output of IF amplifiers 12 is applied to a detector 14 which removes the amplitude modulated video signal and applies it to video amplifier 16. The sound signal is removed, amplified, clipped, and limited in audio section 18. The output of audio detector 18 is applied to audio amplifier 20 which is similar to audio amplifiers found in radio receivers. The output of the audio amplifier is applied to the speaker.

Video amplifier 16 requires more bandwidth than audio amplifier 20. This is accomplished using special peaking circuits for the high and low frequency response. The output of video amplifier 16 is applied to the picture tube and to a sync separator 22 which is unique to television receivers. As described earlier, the horizontal and vertical synchronization pulses appear on top of their respective blanking signals which are sandwiched in between lines of picture signal. The sync separator clips the synchronization pulses off the composite video signal after the signal has been amplified in video amplifier 16. Two separate filters may be employed to separate the vertical from the horizontal synchronization pulses. For example, a high pass filter would permit only the horizontal synchronization pulses to reach horizontal sweep section 24 while the vertical pulses could be passed through a low pass filter to the vertical sweep section 26.

The vertical sweep section generates the actual signals which pass through the deflection yoke of the picture tube to move the electron beam up and down. Similarly, the horizontal sweep section is responsible for moving the electron beam across the tube. In order to obtain the large current of short duration required in the horizontal deflection coils, a transformer is generally used. Furthermore, a flyback transformer is generally considered part of the horizontal sweep section. This transformer generates a high voltage during the time in which the electron beam returns from right to left.

Co-pending U.S. patent application Ser. No. SC-80979 entitled "Large Scale, Single Chip Integrated Circuit Television Receiver Subsystem", and filed of even date herewith describes a VLSI single chip black and white television receiver into which the inventive vertical sync counter may be incorporated. It is to be understood, however, that the present invention may also be incorporated into a color TV receiver.

Referring now to FIG. 4, it is seen that the vertical and horizontal sweep system of a TV receiver may include a free running horizontal oscillator 28 the output of which is coupled to a horizontal sweep generator 30 after being divided in half by a divider 29. The horizontal oscillator 28 output is also coupled as an input to a vertical counter 34 by way of a lead 32. The input to the free running horizontal oscillator 28, in the presence of a received TV signal, is the horizontal sync signal. In the absence of a vertical sync pulse applied thereto which is extracted from the received TV signal, the vertical counter 34 will count up to a predetermined number of pulses provided by the horizontal oscillator 28 which predetermined number of pulses is slightly greater than the number of lines in each frame. Upon counting up to this predetermined number of pulses, the vertical counter 34 will automatically reset and provide a vertical output pulse to a vertical sweep generator 36. The output of the vertical sweep generator 36 and the horizontal sweep generator 30 is applied to the picture tube (FIG. 3) to provide a raster scan thereon. The presence of the vertical and horizontal sync pulses from a received TV signal enable the picture on the picture tube to be synchronized with the picture being transmitted in a well known manner.

Referring now to FIGS. 5 and 6 a vertical sync counter 38 in accordance with the present invention includes ten flip-flops A through J, interconnected in a well known manner and which counts horizontal pulses from the horizontal oscillator 30 applied thereto by way of lead 32 and an inverter 40 and lead 42. The horizontal pulses which are counted by the vertical counter 38 are illustrated in FIG. 6 as waveshape 41. A "D" type flip-flop 44 has its $\overline{C}$ input coupled to receive the horizontal pulses 41 outputted from the inverter 40. The D input of the flip-flop 44 is adapted to receive the vertical sync pulses provided by a received TV signal by way of an inverter 46 and a lead 48. In addition, the D input of the flip-flop 44 receives the output of AND gate 68 by way of leads 67 and 48 whenever a predetermined count appear in the counter 38 in a manner as described hereinbelow. Additionally, when the switch 66 is closed the D input of the flip-flop 44 is also adapted to receive the output of an AND gate 62 by way of an inverter 64 and leads 67 and 48. The D input to the flip-flop 44 is illustrated in FIG. 6 as waveshape 43. The operation of the D flip-flop 44 is such that the inverse of the potential appearing on the D input appears on the $\overline{Q}$ output at each negative going transition of the horizontal pulse input at $\overline{C}$. The $\overline{Q}$ output of the D flip-flop 44 is illustrated in FIG. 6 as waveshape 45 and is applied to all of the stages A to J of the vertical counter 38 to reset R the counter and is also applied as one input to and AND gate 52.

In addition to the $\overline{Q}$ output of the "D" flip-flop 44, the AND gate 52 has an input the state of the G flip-flop in the counter 38. The output of the G flip-flop is illustrated in FIG. 6 as waveshape 53. When enabled, the AND gate 52 provides a signal on lead 60 which resets a latch circuit 54 as described in more detail hereinbelow. A gate 50 has as inputs the states of the B, F and G flip-flops in the vertical counter 38. The states of these three flip-flops are illustrated in FIG. 6 as waveshapes 49, 51 and 53 respectively. The gate 50 is enabled whenever the count of ninety eight occurs in the counter 38 and provides one of two inputs to an AND gate 62.

The second input to the gate 62 is provided by the L output of the latch circuit 54. The L output is low when the latch circuit 54 is reset and is high when the latch is set. The latch 54 circuit constitutes a well known circuit in which two NAND gates are interconnected in a manner as shown in FIG. 5. The L output of the latch circuit 54 is illustrated in FIG. 6 as waveshape 55 and the set input applied to the latch circuit 54 from the J flip-flop of the counter 38 by way of lead 58 is illustrated in FIG. 6 as waveshape 59. The output of the gate 62 is applied to the D input of the flip-flop 44 by way of inverter 64 as long as a switch 66 is open and is shown in FIG. 6 as waveshape 57. The switch 66 may constitute a mechanical on/off switch. However, when the present invention is incorporated as part of an integrated circuit, the switch 66 may constitute a small strip of metallization which is present when the switch 66 is to be closed and which is not present, i.e. is not deposited, when the switch 66 is to be opened. The switch 66 may also constitute a pin on the IC package that is or is not connected to ground. Switch 66 being opened or closed determines which mode of operation the counter 38 will operate in as is described in detail hereinbelow. Nevertheless and as will now be apparent to those skilled in the art, when the latch 54 is set the output of the gate 50 will be passed by the inverter 64 to the "D" flip-flop 44 whereas when the L output from the latch 54 is low the output from the gate 50 will not be so passed by the inverter 64.

In a first mode of operation the switch 66 is closed and the counter 38, in the absence of a vertical sync pulse from a received TV signal, will count up to a first predetermined number of horizontal pulses 41 which is slightly greater than the number of lines in a picture frame at which time the counter 38 will automatically reset and provide a vertical output pulse for the vertical sweep generator 36 (FIG. 4) and again begin counting up to the predetermined number of horizontal pulses. In the presence of a received vertical sync pulse, the counter 38 will be reset by the vertical sync pulse being applied to the inverter 46 rather than being reset automatically. More specifically and in reference to FIGS. 5 and 6, assume that the negative going pulse on the left hand side of waveshape 43 corresponds to a received vertical sync pulse which is applied to the inverter 46 to appear at the "D" input of the "D" flip-flop 44 as a low level signal. This will cause the $\overline{Q}$ output 45 which was low to become high at the next negative going horizontal pulse 41. The high $\overline{Q}$ output 45 is applied to all of the stages A through J of the vertical counter 38 thereby resetting the counter 38. Now that the counter 38 has been reset, the counter 38 will begin counting horizontal pulses 41 at the next negative going transition thereof. As will best be seen by a perusal of 46, once a sync pulse 43 occurs two complete horizontal pulse 41 cycles take place before the counter 38 again starts counting horizontal pulses 41. In other words, resetting of the counter 38 requires two cycles of horizontal pulses 41. In the absence of a received vertical sync pulse being applied to the inverter 46, the counter 38 will continue counting to a count which is slightly greater than the number of lines in a picture frame. When this predetermined number is reached, the F and J inputs to the AND gate 68 are high causing the D input of the "D" flip-flop 44 to be low thereby resetting the counter 38 in a manner as described hereinabove. As will be apparent to those skilled in the art, the output from the gate 68 may also be utilized to provide an input to the vertical sweep generator 36 (FIG. 4). In one embodiment of the present invention which was constructed, the horizontal oscillator 28 (FIG. 4) resonated at a frequency which was twice the normal horizontal sweep frequency and therefore had to be counted down by two by the divider 29 before it was applied to the horizontal sweep generator 30. However, the original horizontal oscillator 28 output was applied to the vertical counter 38. Accordingly, in the first mode of operation in which the switch 66 is closed, the counter 38 counted up to a count which was greater than twice the number of lines in a frame i.e. 544 horizontal pulses, before being automatically reset as described hereinabove by the F and J inputs of gate 68 going high. In the event of a vertical sync pulse appearing on the input of inverter 46, the counter 38 reaches a count of about five hundred twenty five before being reset by the received vertical sync pulse thereby providing a first mode of operation which would enable the vertical counter 38 to operate in a TV receiver which received five hundred twenty-five lines per picture as is the case in the United States.

In the second mode of operation the switch 66 is open and the counter 38 will count up to a second predetermined number of horizontal pulses which is greater than that to which it will count up to before being automatically reset in the first mode of operation. This enables the counter 38 to operate in a TV system having a higher number of lines per picture, such as six hundred twenty-five lines per picture as is used in the European TV system. Briefly, this is accomplished by the counter 38 counting to a predetermined number of horizontal pulses 41 and automatically resetting without providing a vertical pulse output to trigger the sweep and then again counting up to at least another predetermined number of horizontal pulses at which time a sweep trigger pulse is provided. The sum of the two groups of horizontal pulses counted being greater than the number of horizontal lines per picture of the received signal. More specifically assume that the counter 38 has been automatically reset, at this point in time the latch circuit 54 is set and the L output thereof is high. As described hereinabove, resetting the counter 38 takes two full cycles of horizontal pulses 41 such that when the counter 38 starts counting two horizontal pulses 41 have already occurred. The counter 38 will count horizontal pulses 41 until the count therein becomes ninety eight which, because of the two cycles needed to reset the counter 38, corresponds to the occurrence of one hundred horizontal pulses 41. At this time the B, F and G inputs of the AND gate 50 will be high resulting in the output thereof being high which output is applied as the second input to the AND gate 62. Since the L input of AND gate 62 is also high, the output of AND gate 62 is also high and is inverted by the inverter 64 to cause the D input to the "D" flip-flop 44 to become low thereby resulting in resetting of the vertical counter 38. However, at this time no output is provided to the vertical sweep generator 36 (FIG. 4). Resetting of the counter 38 causes the R input to the AND gate 52 to be high while a count of ninety eight causes the G input of gate 52 to be high. This results in the output on lead 60 becoming low thereby resetting the latch circuit 54 which results in the L output going low. During resetting of the counter 38 two horizontal pulse periods occurred which were not counted by the counter 38 as described hereinabove. As the counter 38 begins counting again, the count therein will be four counts short of the actual number of horizontal 41 cycles which have occurred since the last vertical sync pulse. When the count in the counter 38 again becomes ninety eight, the AND gate 50 will again be enabled. However, since the L input to AND gate 62 is low, the AND gate 62 will not be enabled and the counter 38 will continue counting a count five hundred twelve is registered therein at which time the $\overline{Q}$ output of the J flip-flop goes low thereby resetting the latch circuit 54 thereby causing the L output thereof to be high for the next cycle of operation of the counter 38. When the count within the counter 38 reaches five hundred forty-four the J and F inputs to AND gate 68 will be high thereby enabling AND gate 68 and causing the input to the D terminal of the "D" flip-flop 44 to go low which results in the resetting of the counter 38 in a manner as described hereinabove. The output of the AND gate 68 may also be applied to the vertical sweep generator 36 of FIG. 4. Due to the previous count in the counter 38 and the present count of five hundred forty-four plus the cycles of horizontal input pulses 41 which were not counted as the counter 38 was reset, the vertical pulse for the sweep generator 36 (FIG. 5) is generated for a count in excess of six hundred twenty-five pulses from the horizontal oscillator 28 (FIG. 4). The cycle will repeat itself until the occurrence of a received vertical sync pulse at the input of the inverter 46 which will synchronize the counter 38 with the received signal without the necessity of the counter 38 resetting automatically.

The vertical counter system for a TV receiver described hereinabove in conjunction with FIGS. 5 and 6 may be fabricated with discrete components or may be formed on an integrated circuit chip as I$^2$L, T$^2$L, ECL, MOS logic or the like. As is made clear from the above description. The vertical sync counter 38 illustrated in FIG. 5 enables one counter to be utilized in a TV receiver to provide vertical sync pulses which may be utilized in TV systems having a different number of lines per frame, i.e. the counter 38 has a first mode of operation for a first number of lines per picture and at least a second mode of operation for a TV system having a different number of lines per picture with the conversion of the counter from the first to second mode of operation being the mere absence of a conductive strip of material which enables the improved vertical sync counter 38 to be readily and economically fabricated.

As will be apparent to those skilled in the art, the improved vertical sync counter for a TV receiver described herein may be improved or modified without departing from the spirit and scope of the present invention as defined by the following claims:

I claim:

1. A vertical counter for a TV receiver having a horizontal oscillator for providing horizontal sync pulses which are coupled to at least said counter to be counted thereby:
   said counter adapted to provide output pulses to a vertical sweep generator,
   said counter adapted to receive a vertical sync pulse to synchronize said counter,
   said counter having a first mode of operation wherein said counter counts up to a first predetermined number of said horizontal pulses at which time said counter is automatically reset and at least a second mode of operation wherein said counter counts up to a second predetermined number of said horizontal pulses at which time said counter is automatically reset.

2. The counter according to claim 1 wherein:
   said second predetermined number is larger than said first predetermined number.

3. A counter according to claim 2 wherein said counter in said second mode of operation has a cycle of operation wherein said counter counts up to a third predetermined number of pulses which is less than said first number of predetermined pulses at which time said counter is automatically reset after which said counter counts up to at least a fourth predetermined number of pulses at which time said counter is automatically reset and said cycle is repeated.

4. The vertical counter according to claim 3 wherein: the sum of said third and fourth predetermined number of pulses equals said second predetermined number of pulses.

5. The vertical counter according to claim 3 further including:
first means coupled to said counter and adapted to reset said counter in response to a reset signal applied to said first means, and
second means coupled between said counter and said first means to provide said reset signal to said first means when said counter counts to said first predetermined number in said first mode of operation and when said counter counts to each said third and fourth predetermined numbers in said second mode of operation.

6. The vertical counter according to claim 5 further including:
third means coupled to said second means in said second mode of operation to prevent said second means from providing said first means with said reset signal corresponding to said third predetermined count in said counter after said counter has counted to said third predetermined number and while said counter is counting up to said fourth predetermined number in a cycle of operation.

7. The vertical counter according to claim 5 wherein: said first means includes a flip-flop having an output coupled to said counter and an input adapted to receive said reset signal from said second means.

8. The vertical counter according to claim 5 wherein: said second means includes a decoder coupled to said counter for providing said reset signals to said first means.

9. The vertical counter according to claim 6 wherein: said third means includes a latch circuit which is set and reset by predetermined counts in said counter.

10. The vertical counter according to claim 9 further including:
means to disable said latch to enable said counter to operate in one of said modes of operation.

11. The vertical counter according to claim 10 further including:
means to enable said latch to enable said counter to operate in the other mode of operation.

12. The vertical counter according to claim 9 further including:
gating means having an output coupled to said first means and an input coupled to predetermined outputs of said second means and to said latch circuit whereby setting said latch circuit enables predetermined reset signals from said second means to be coupled to said first means and whereby resetting of said latch circuit prevents predetermined reset signals from said second means from being coupled to said first means.

13. The vertical counter according to claims 1, 6 or 9 wherein:
the claimed combination is formed in an integrated circuit.

14. A vertical counter for a TV receiver having a horizontal oscillator for providing horizontal sync pulses which are coupled to at least said counter to be counted thereby:
said counter adapted to provide output pulses to a vertical sweep generator,
said counter adapted to receive a vertical sync pulse to synchronize said counter,
said counter having a first mode of operation wherein said counter counts up to a first predetermined number of said horizontal pulses at which time said counter is automatically reset and at least a second mode of operation wherein said counter counts up to a second predetermined number of said horizontal pulses at which time said counter is automatically reset,
said second predetermined number being larger than said first predetermined number,
said counter in said second mode of operation having a cycle of operation wherein said counter counts up to a third predetermined number of pulses which is less than said first number of predetermined pulses at which time said counter is automatically reset after which said counter counts up to at least a fourth predetermined number of pulses at which time said counter is automatically reset and said cycle is repeated.
the sum of said third and fourth predetermined number of pulses being equal to said second predetermined number of pulses.

15. The vertical counter according to claim 14 further including:
reset means coupled to said counter and adapted to reset said counter in response to a reset signal applied to said first means,
decoder means coupled between said counter and said first means to provide said reset signal to said first means when said counter counts to said first predetermined number in said first mode of operation and when said counter counts to each said third and fourth predetermined numbers in said second mode of operation, and
means coupled to said second means in said second mode of operation to prevent said decoder means from providing said reset means with said reset signal corresponding to said third predetermined count in said counter after said counter has counted to said third predetermined number and while said counter is counting up to said fourth predetermined number in a cycle of operation.

16. The vertical counter according to claim 15 wherein:
said reset means includes a flip-flop having an output coupled to said counter and an input adapted to receive said reset signal from said decoder means.

17. The vertical counter according to claim 14 further including:
gating means having an output coupled to said reset means and an input coupled to predetermined outputs of said decoder means and to said means to prevent predetermined reset signals from said decode means to be coupled to said reset means and to prevent predetermined reset signals from said decode means from being coupled to said first means.

18. The vertical counter according to claims 15 wherein:
the claimed combination is formed in an integrated circuit.

19. The vertical counter according to claim 14 further including:
means to enable said counter to operate in said first or said second mode of operation.

* * * * *